United States Patent [19]

Chao et al.

[11] Patent Number: 5,587,217
[45] Date of Patent: Dec. 24, 1996

[54] LUBRICANT COMPOSITION AND METHOD

[75] Inventors: James L. Chao, Milpitas; Yu-Cheun Lee, Newark; Chao Gao, Fremont, all of Calif.

[73] Assignee: HMT Technology Corporation, Fremont, Calif.

[21] Appl. No.: 497,431

[22] Filed: Jun. 30, 1995

Related U.S. Application Data

[63] Continuation-in-part of Ser. No. 270,240, Jul. 1, 1994, abandoned.

[51] Int. Cl.$^6$ ................................................ G11B 5/71
[52] U.S. Cl. ............... 428/65.4; 428/65.5; 428/694 TF; 428/694 TC; 428/421; 428/900; 508/425
[58] Field of Search ....................... 428/65.4, 65.5, 428/694 TF, 694 TC, 900, 421; 252/49.9

[56] References Cited

U.S. PATENT DOCUMENTS

| | | | |
|---|---|---|---|
| 3,234,304 | 2/1966 | Nichols | 558/76 |
| 3,306,854 | 2/1967 | Gumprecht | 252/49.9 |
| 3,316,330 | 4/1967 | Nichols | 558/80 |
| 4,018,967 | 4/1977 | Roller et al. | 428/425 |
| 4,194,983 | 3/1980 | Paciorek et al. | 252/49.9 |
| 4,613,548 | 9/1986 | Lum | 428/411.1 |
| 4,871,625 | 10/1989 | Dekura | 428/695 |
| 5,015,405 | 5/1991 | Kar et al. | 252/49.9 |
| 5,049,410 | 9/1991 | Johary et al. | 427/131 |
| 5,128,216 | 7/1992 | Ng | 428/625 |
| 5,230,964 | 7/1993 | Kar et al. | 428/694 |
| 5,441,655 | 8/1995 | Odello et al. | |

FOREIGN PATENT DOCUMENTS

| | | |
|---|---|---|
| 0287892 | 10/1988 | European Pat. Off. . |
| 0421747 | 4/1991 | European Pat. Off. . |
| 0597369 | 5/1994 | European Pat. Off. . |
| 0655733 | 5/1995 | European Pat. Off. . |
| 55-39661 | 3/1980 | Japan . |
| 61-104319 | 5/1986 | Japan . |
| 3-266216 | 11/1991 | Japan . |
| 92/11631 | 7/1992 | WIPO . |

OTHER PUBLICATIONS

Nader, B. S., et al., Development and Tribological Properties Of New Cyclotriphosphazene High Temperature Lubricants for Aircraft Gas Turbine Engines, Tribology Transactions 35:37–44 (1992).

Yang, M., et al., Cyclotriphosphazenes as Potential Lubricants For Thin Film Hard Disks, Tribology Transactions, 38:636–644 (1995).

Yang, M., et al., Environmental Effects on Phosphazene Lubricated Computer Hard Disks, IEEE Transactions on Magnetics, 30:4143–4145.

*Primary Examiner*—Stevan A. Resan
*Attorney, Agent, or Firm*—Vincent M. Powers

[57] ABSTRACT

A thin-film magnetic recording disc for use with a read/write head in a disc drive is disclosed. To reduce the static and dynamic frictional coefficients of the disc surface, the disc is coated with a lubricant layer composed of a mixture of a polyphenoxycyclotriphosphazene lubricant and a perfluoropolyether oil. Also disclosed is a lubricant composition containing these two components, as well as a method for improving the lubricating properties of a perfluoropolyether oil.

9 Claims, 3 Drawing Sheets

| LUBRICANT | FORMULA | MOLECULAR WEIGHT, DALTONS |
|---|---|---|
| Fomblin Z-25 | $CF_3\text{-}O\text{-}(CF_2\text{-}CF_2\text{-}O)_m\text{-}(CF_2\text{-}O)_n\text{-}CF_3$ | 12,800 |
| Fomblin Z-15 | $CF_3\text{-}O\text{-}(CF_2\text{-}CF_2\text{-}O)_m\text{-}(CF_2\text{-}O)_n\text{-}CF_3$  (m/n ~2/3) | 9100 |
| Fomblin Z-03 | $CF_3\text{-}O\text{-}(CF_2\text{-}CF_2\text{-}O)_m\text{-}(CF_2\text{-}O)_n\text{-}CF_3$ | 3600 |
| Fomblin Z-DOL | $HO\text{-}CH_2\text{-}CF_2\text{-}O\text{-}(CF_2\text{-}CF_2\text{-}O)_m\text{-}(CF_2\text{-}O)_n\text{-}CF_2\text{-}CH_2\text{-}O\text{-}H$ | 2000 |
| Fomblin AM 3001 | Piperonyl-$O\text{-}CH_2\text{-}CF_2\text{-}O\text{-}(CF_2\text{-}CF_2\text{-}O)_m\text{-}(CF_2\text{-}O)_n\text{-}CF_2\text{-}CH_2\text{-}O$-piperonyl[1] | 3100 |
| Fomblin YR | $CF_3\text{-}O\text{-}(\underset{F}{\underset{|}{\overset{CF_3}{\overset{|}{C}}}}\text{-}CF_2\text{-}O)_m\text{-}(CF_2\text{-}O)_n\text{-}CF_3$  (m/n ~40/1) | 6800 |
| Demnum S-100 | $CF_3\text{-}CF_2\text{-}CF_2\text{-}O\text{-}(CF_2\text{-}CF_2\text{-}CF_2\text{-}O)_m\text{-}CF_2\text{-}CF_3$ | 5600 |
| Krytox 143AD | $CF_3\text{-}CF_2\text{-}CF_2\text{-}O\text{-}(\underset{F}{\underset{|}{\overset{CF_3}{\overset{|}{C}}}}\text{-}CF_2\text{-}O)_m\text{-}CF_2\text{-}CF_3$ | 2600 |

[1] 3,4-methylenedioxybenzyl

LUBRICANT COMPOSITION AND METHOD

This application is a continuation-in-part of application Ser. No. 08/270,240 filed Jul. 1, 1994.

FIELD OF THE INVENTION

The present invention relates to an improved lubricant composition and method, particularly for use in reducing static and dynamic frictional coefficients of a thin-film recording medium.

REFERENCES

Allcock, H. R., et al., *Macromolecules* 14:1614–1622 and 1622–1625 (1981).

Benzoari, M. D., U.S. Pat. No. 4,864,047 issued Sep. 5, 1989.

Inoue, et al., *Makromol. Chem., Rapid. Commun.* 467–470 (1990).

Kober, E., et al., *Inorg. Chem.* 5:2239–2240 (1966).

Kumar, D., et al., U.S. Pat. No. 4,748,263 issued May 31, 1988.

Kumar, D., et al., *Polyhedron* 11:1671–1678 (1992).

Nader, B. S., et al., *Tribology Trans.* 35:1,37–44 (1992).

Yang, Y. W., et al., *Polyhedron* 12:59–68 (1993).

BACKGROUND OF THE INVENTION

Thin-film magnetic discs or media are widely used as data storage media for digital computers. The discs are typically formed by successively sputtering onto a rigid disc substrate, an underlayer, a magnetic layer, and a carbon overcoat which protects the magnetic layer against wear and reduces frictional forces between the disc and a read/write head.

It is also common to lubricate the disc, in a final surface treatment, with a thin film of a fluorocarbon lubricant, to reduce frictional interactions between the head and the disc, particularly during start/stop cycles. Standard lubricants for this purpose are perfluoropolyether oils, such as "AM 2001" or "Z-DOL" lubricant supplied commercially by Ausimont (Morristown, N.J.).

The lubricity properties of discs are generally measured in terms of dynamic and/or static coefficients of friction. Dynamic friction coefficients are typically measured using a standard drag test in which the drag produced by contact of a read/write head with a disc is determined at a constant spin rate, e.g., 1 rpm. Static coefficients of friction (stiction values) are typically measured using a standard contact start-stop (CSS) test in which the peak level of friction is measured as the disc starts rotating from zero to a selected revolution rate (e.g., to 5000 rpm). After peak friction has been measured, the disc is brought to rest, and the start-stop process is repeated for a selected number of start-stop cycles. One important property of a disc which is required for good long-term disc and drive performance is that the disc retain a relatively low coefficient of friction after many start/stop cycles or contacts with a read/write head. For example, a drive manufacturer may require that the disc have an initial stiction value of no greater than 0.3, and a stiction value of no greater than 1.5 or 2 after 20,000 start/stop cycles. A disc that meets such a specification can thus tolerate at least 20,000 start/stop cycles without exhibiting high friction characteristics that would deleteriously interfere with read/write operations.

Heretofore, the most commonly employed lubricants used with magnetic media, and particularly the perfluoropolyether class of lubricants, have been found to perform well under ambient conditions but not under conditions of higher temperature and high or low humidity. Thus, it has been necessary to use temperature and humidity control systems to avoid less favorable environmental conditions which would otherwise cause a rapid reduction in disc performance.

Accordingly, there is a need for improved lubricant compositions which are able to provide good frictional properties not only under ambient conditions, but under conditions of higher temperature and high or low humidity as well.

SUMMARY OF THE INVENTION

The invention includes, in one aspect, a thin-film magnetic recording disc for use with a read/write head in a disc drive. Typically, the disc includes a substrate, a magnetic recording film formed on the substrate, a protective overcoat formed on the recording film, such as a sputtered carbon overcoat, and an outer lubricant layer comprising a polyphenoxycyclotriphosphazene lubricant and a perfluoropolyether oil. Each phenoxy group in the polyphenoxy-cyclotriphosphazene lubricant, taken separately, is either unsubstituted or is substituted with one or more short chain substituents as defined further below. The polyphenoxycyclotriphosphazene lubricant and perfluoropolyether oil are present in the sublayer in relative proportions effective to provide a significant reduction in frictional drag relative to the reduction in drag provided by the polyphenoxytriphosphazene lubricant or perfluoropolyether oil alone.

In one embodiment, the polyphenoxycyclotriphosphazene lubricant and perfluoropolyether oil are present in separate sublayers which together form the outer lubricant layer.

In a second embodiment, the polyphenoxycyclotriphosphazene lubricant and perfluoropolyether oil are present as a mixture.

In one general embodiment, the polyphenoxycyclotriphosphazene lubricant and perfluoropolyether oil are present in a volume-to-volume ratio (lubricant:oil) from 1:100 to 5:1. In a preferred embodiment, the ratio is from 1:100 to 1:1, and in another preferred embodiment, the ratio is from 1:5 to 5:1.

The polyphenoxycyclotriphosphazene lubricant is preferably a hexaphenoxycyclotriphosphazene compound, and the polyphenoxy groups are preferably substituted with fluorine-containing substituents. In one preferred embodiment, the polyphenoxycyclotriphosphazene lubricant is bi(4-fluorophenoxy)-tetrakis(3-trifluoromethylphenoxy)cyclotriphosphazene.

In another aspect, the invention includes a lubricant mixture for use in reducing the static and dynamic coefficient of friction on a surface. The mixture comprises a polyphenoxy-cyclotriphosphazene lubricant and a perfluoropolyether oil such as described above.

In still another aspect, the invention includes a method of improving the lubrication properties of a perfluoropolyether oil, as evidenced by a significantly reduced static or dynamic coefficient of friction on a surface coated with the oil. The method includes admixing with the oil, a polyphenoxycyclotriphosphazene lubricant of the type described above.

These and other objects and features of the invention will be more fully appreciated when the following detailed description of the invention is read in conjunction with the accompanying drawings.

DETAILED DESCRIPTION OF THE INVENTION

The present invention is based on the discovery that the mutual presence of a perfluoropolyether oil compound and a polyphenoxytriphosphazene lubricant compound in the outer surface layer of a magnetic disc can provide a significant reduction in frictional drag relative to the reduction in drag provided by the perfluoropolyether or polyphenoxytriphosphazene compounds alone, particularly under conditions of elevated temperature and/or high or low humidity. By "significant reduction" is meant a reduction in the static or dynamic friction coefficient of the disc surface, as measured using standard techniques, by at least 20% relative to the friction coefficient characteristic measured for the perfluoropolyether or polyphenoxycyclotriphosphazene separately, and as measured at elevated temperature conditions of either 30° C. and 80% humidity, or 55° C. and 10% humidity.

I Thin-Film Medium

Figure 1:
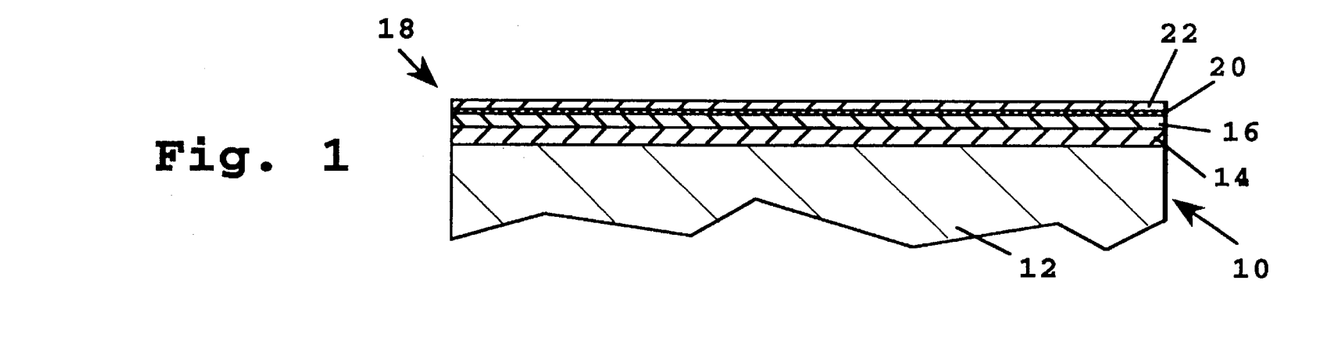
FIG. 1 shows a thin-film medium having a layer of lubricant according to the present invention.

FIG. 1 shows in cross section view, a fragmentary portion of a thin-film medium 10 composed of a rigid disk-like substrate 12, and forming successive thin-film layers over the substrate, a crystalline underlayer 14, a magnetic thin-film layer 16, an overcoat 18, and a lubricating layer 20.

The substrate may be a textured substrate, such as a conventional surface-coated, textured aluminum substrate of the type used commonly for digital recording medium, or a textured glass or ceramic substrate.

The crystalline underlayer is preferably a sputtered chromium underlayer having a thickness between about 300–3,000 Å. Alternatively, the underlayer may be formed of a chromium based alloy, such as CrGd, CrV, CrTi or CrSi.

The magnetic film layer is preferably a cobalt-based alloy, that is, an alloy containing at least 50% cobalt, which is formed on the underlayer by sputtering or the like. Exemplary thin-film alloys include binary alloys and ternary alloys, such as Co/Cr, Co/Ni, Co/Cr/Ta, Co/Ni/Pt, or Co/Cr/Ni, and quaternary and five-element alloys, such as Co/Ni/Cr/Pt, Co/Cr/Ta/Pt, Co/Cr/Ta/Pt/B, or Co/Cr/Ni/Pt/B. The underlayer and the magnetic thinfilm layer are deposited under sputtering conditions known by those skilled in the art.

A wear-resistant, protective overcoat 18 is sputtered over the magnetic recording layer and may be composed of carbon (preferred embodiment), silicon oxide, silicon nitride, or the like.

Lubricating layer 20 is included on top of the protective overcoat, for reducing frictional interactions with a read/write head. Conveniently, application of the lubricant is by the gravity-draining dip method, as described further below.

II. Lubricant Components

The lubricant mixture of the invention is one that contains two types of lubricant materials, as contiguous sublayers or as a mixture, which provides significantly better lubricating properties than either lubricant material alone, particularly under elevated temperature conditions.

Figure 2:
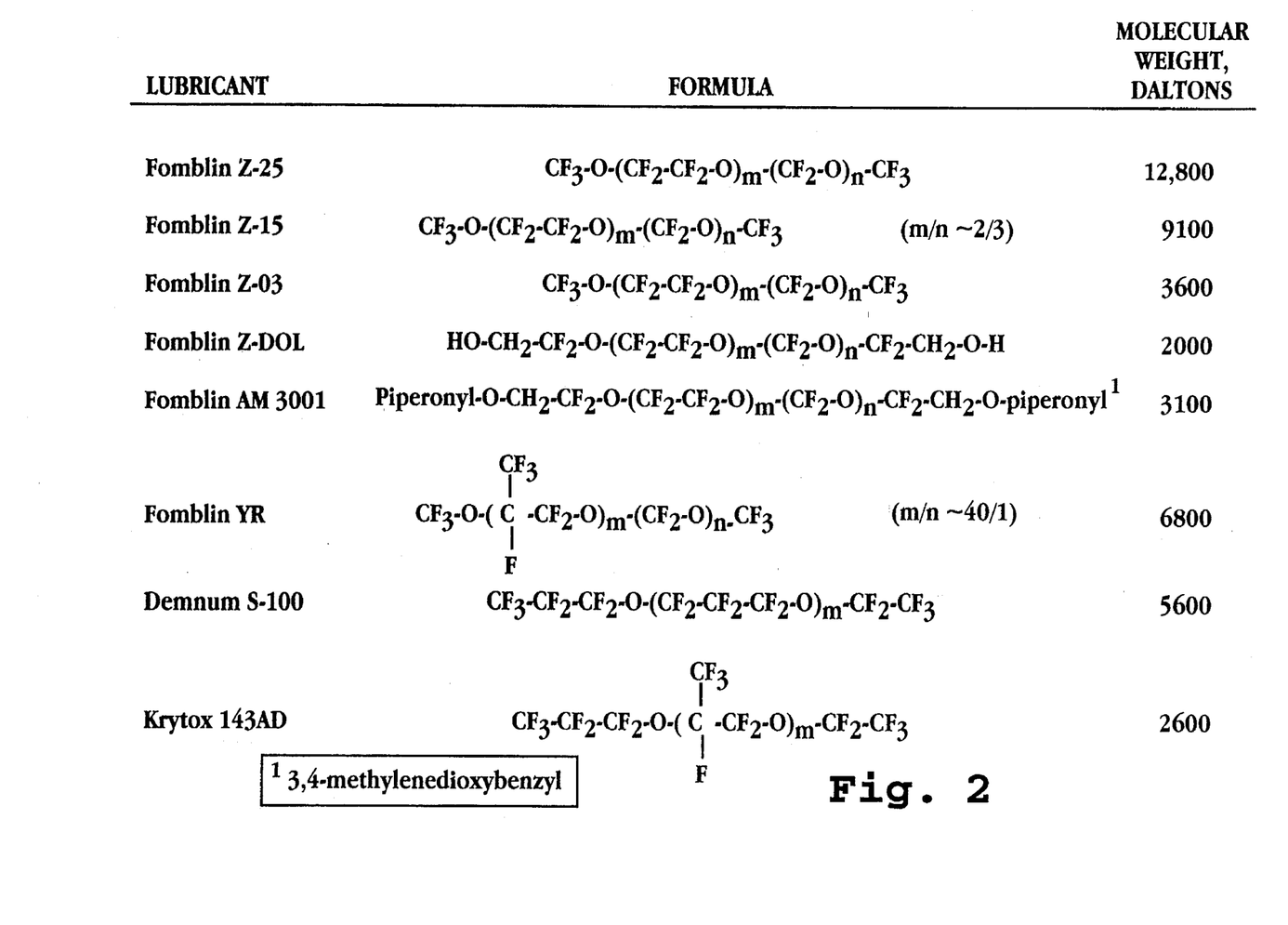
FIG. 2 shows structures of exemplary perfluoropolyether compounds for use in accordance with the invention.

The first lubricant type is selected from the class of lubricants known as perfluoropolyether oils. By the term "oils" is meant a composition which is water-insoluble and non-volatile. Such perfluoropolyether oils include perfluoroalkylpolyether compounds of the formula $R-O-(CX_2CY_2-O)_m-(CZ_2-O)_n-R$, where m and n are integers; R is H, $CF_3$, $CH_3$, piperonyl, or R'; where R' is $CF_2CH_2OH$, $CF_2CH_2O-CF_3$, $CF_2CH_2OCH_3$, or $CF_2CH_2O$—piperonyl; $CX_2$ is $CF_2$ or $CF(CF_3)$; and $CY_2$ and $CZ_2$ are $CF_2$. Illustrative perfluoropolyether oil compounds, available from Ausimont (Morristown, N.J.) are shown in FIG. 2. The class also includes compounds of the formula $CF_3CF_2CF_2-O-(Z-O)_mCF_2CF_3$, where Z is $CF(CF_3)-CF_2$ or $CF_2CF_2CF_2$. Further examples, not shown in FIG. 2, include additional perfluoropolyether oils commercially available from Daikin Industries, Ltd. (Osaka Japan) under the names "DEMNUM SA" $(F(CF_2CF_2CF_2O)_nCF_2CF_2-CF_2OH)$, "DEMNUM SH" $(F(CF_2CF_2CF_2O)_nCF_2CF_2CO_2H$, "DEMNUM SP" and "DEMNUM SY" $(F(CF_2CF_2CF_2O)_nCF_2CF_2X$, where X is an ester derivative of "DEMNUM SP". The Demnum compounds are available in a molecular weight range of about 2,200 to about 5,600 daltons. More generally, the variables m and n are selected to afford a total molecular weight for the perfluoropolyether oil of between about 1,500 and about 30,000, and preferably between about 2,000 and 15,000. The perfluoropolyether oils for use in the invention may be obtained commercially as noted above, or are prepared by known chemical methods.

The second lubricant component is selected from the class of compounds known as polyphenoxycyclotriphosphazenes. These compounds are characterized by a cyclotriphosphazene ring $(PN)_3$ having a plurality of phenoxy or substituted-phenoxy substituents attached to the phosphorous atoms in the ring. A general backbone structure for these compounds is shown in FIG. 3.

Figure 3:
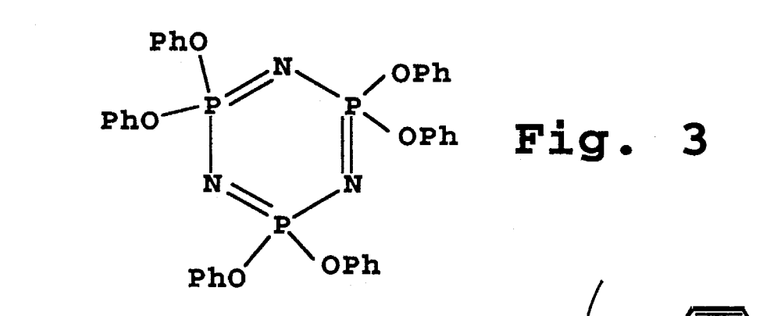
FIG. 3 shows a general structure for polyphenoxytriphosphazene compounds for use in accordance with the invention.

The phenoxy (—OPh) groups in the FIG. 3 structure may be unsubstituted (i.e., all ring substituents are H), but preferably are substituted with one or more short chain substituents which, preferably, are fluorinated. By "short chain substituent" is meant a substituent containing zero to three heteroatoms selected from N, C, and O, and where no more than one of the heteroatoms is O or N with the exception that the short chain substituent may be $NO_2$, and the remaining radicals in the substituent are H, F, or OH. Exemplary short chain substituents include F, $NO_2$, $CF_3$, $CH_3$, $OCF_3$, $OCH_3$, $N(CH_3)_2$, $CF_2CF_3$, $CF=F_2$, $CH_2CF_3$, $CH=CF_2$, $CH_2CH_3$, $CH=CH_2$, $OCF_2CF_3$, and $OCH_2CF_3$. Preferably, the short chain substituents are selected from the group consisting of F, $CF_3$, $OCF_3$, $CF_2CF_3$, $CH_2CF_3$, $OCF_2CF_3$, and $OCH_2CF_3$, and more preferably, the short chain substituent is F, $CF_3$, or $OCF_3$. Preferably, there are no more than two short chain substituents per phenoxy group, and more preferably, there are one or zero short chain substituents. Fluorine-containing substituents are preferred both for long-term chemical stability and also to render the solubility properties of the cyclotriphosphazene compound closer to those of the perfluoropolyether oil. The latter feature is advantageous for deposition, whereby the two lubricant materials may be deposited using a single solution.

The polyphenoxycyclotriphosphazene compounds for use in the invention can be synthesized by methods well known in the art, generally using hexachlorocyclotriphosphazene as starting material. The latter compound is commercially available or can be prepared by known methods.

In one synthetic approach, set forth in U.S. Pat. No. 4,864,047 which is incorporated herein by reference, a phenol or substituted phenol (9.6 g, about 0.4 mole=8–10 equivalents) is dissolved in tetrahydrofuran (250 mL) and converted to the sodium salt by rapid addition (over 5 minutes) of a stoichiometric amount of sodium hydride. After the mixture is heated at 60°–67° C. for 24 hours, a solution of hexachlorocyclotriphosphazene (17.3 g, 0.05 mole, 1 equivalent) in tetrahydrofuran (150 mL) is slowly added dropwise by addition funnel, and the reaction is maintained at 60°–67° C. for an additional four days or more, to produce the desired hexaphenoxy product. Conveniently, the progress of the reaction can be monitored by $^{31}P$ NMR. The hexaphenoxy product can then be separated, if desired, from pentaphenoxy material by silica gel chromatography.

In a second approach, to a 500 mL four-neck flask equipped with stirrer, nitrogen inlet, thermometer, and a Dean-Stark water separator, xylene (120 mL) and a powdered mixture of phenol or substituted phenol (35 g) and potassium hydroxide (15 g) are added with vigorous stirring under nitrogen atmosphere. After the mixture is heated slowly to 80° C., hexachlorocyclotriphosphazene (12 g) in xylene (20 mL) is added dropwise over 0.5 hours. The mixture is heated to reflux until about 5 mL water has collected in the Dean-Stark trap (3 hours). The solid product is filtered, dried, and then stirred with 10% aqueous potassium hydroxide. The resultant solid is filtered, washed with warm water, dried, and recrystallized from o-dichlorobenzene or the like to give purified hexaphenoxy product. The above approach is set forth in U.S. Pat. No. 4,748,263, which is incorporated herein by reference.

Other reaction conditions for preparing hexaphenoxycyclotriphophazenes can be found in Allcock et al. (1981, e.g., page 1620), Kober et al. (1966), Kumar et al. (1992), Nader et al. (1992), and Yang et al. (1993), the latter which employs a binary solvent system and a tetraalkylammonium halide (e.g., tetrabutylammonium bromide or methyltrioctylammonium chloride) as transfer catalyst.

Figure 4:
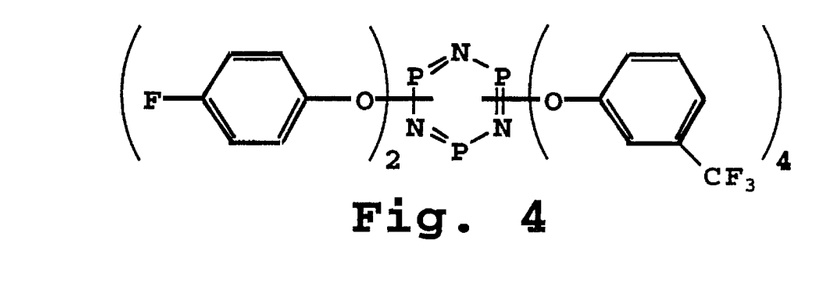
FIG. 4 shows an exemplary polyphenoxytriphosphazene compound for use in the invention.

FIG. 4 shows one preferred hexaphenoxy compound of the invention, which is available from Dow Chemical Co. and is designated herein as "X-1p". The compound is prepared by reaction of hexachlorotriphosphazene with a 4:2 mixture of 3-trifluoromethylphenol and 4-fluorophenol by methods described above. Thus, the polyphenoxytriphosphazene used in the invention may contain two or more differently substituted phenoxy groups whose relative proportions in the triphosphazene compound are determined by proper selection of reactant stoichiometries prior to synthesis. Other compounds of the X-1p type which are useful in the invention are described in Nader et al. (1992).

The polyphenoxytriphosphazene compounds used in the invention preferably contain 5 or 6 phenoxy substituents, and most preferably contain 6. However, triphosphazene compounds containing fewer than 6 phenoxy substituents, e.g., 3 or 5 phenoxy substituents, may also be employed, provided that there are at least 2 phenoxy substituents in the compound. In these instances, the remaining triphosphazene substituent positions are preferably blocked using short alkoxy or perfluoroalkoxy groups, which displace residual chlorine atoms in the ring under generally the same reaction conditions as used for the addition of phenoxy groups. The alkoxy or lower perfluoroalkoxy groups preferably contain one to 5 carbon atoms, as exemplified by $OCH_3$, $OCH_2CH_3$, $OCF_3$, $OCH_2CF_3$, and $OCF_2CF_3$. Reaction conditions for preparing mixed phenoxy-alkoxy triphosphazenes are well known (e.g., Inoue et al., 1990).

III. Method of Producing Magnetic Medium

Figure 5:
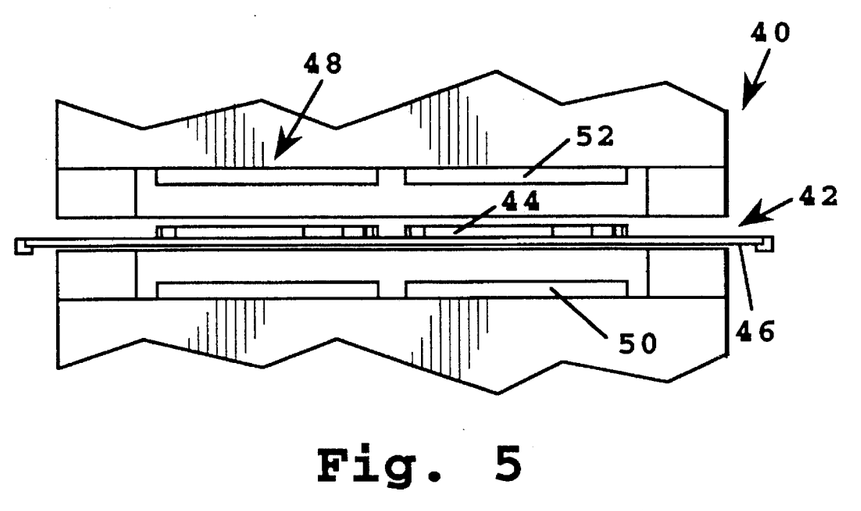
FIG. 5 shows a fragmentary portion of a sputtering apparatus for preparing magnetic discs.

FIG. 5 shows a schematic, fragmentary portion of a sputtering apparatus 40 which may be used for producing the magnetic recording medium of the invention. The apparatus includes a vacuum chamber 42 typically having at least four stations at which sputtering or heating operations occur. A heating station (not shown) at the upstream end of the chamber has a plurality of infrared lights which are arrayed for heating both sides of a substrate, such as substrate 44, carried through the station in the chamber on a pallet 46.

Just downstream of the heating chamber is a first sputtering station 48 designed for sputtering the under-layer onto the substrate. The station includes a pair of sputtering targets for sputtering chromium or a chromium-based alloy, for example, used in forming the underlayer.

A second sputtering station downstream of the first sputtering station is designed for sputtering a magnetic film onto the underlayer. Also included here is a pair of sputtering targets, 50 and 52, for sputtering a cobalt-based alloy, for example, such as those mentioned above, used in forming the magnetic thin film.

Also included in the apparatus, but not shown here, are downstream stations at which a protective overcoat is sputtered on both sides of the magnetic disc.

The basic sputtering apparatus is preferably a commercial system, such as those available from Circuits Processing Apparatus (Fremont, Calif.), ULVAC (Japan), Leybold Heraeus (Germany), VACTEC (Boulder, Colo.), or Materials Research Corporation (Albany, N.Y.). These systems are double-sided, in-line, high-throughput machines having two interlocking systems, for loading and unloading.

In preparing a magnetic disc which can be use in accordance with the invention, the substrate is placed on a pallet, such as pallet 46, in a sputtering apparatus, and the vacuum chamber is evacuated, e.g., to a pressure of about $10^{-7}$ Torr. The substrate is moved through the heating chamber and into the first sputtering chamber, where the underlayer, typically composed of chromium or a chromium-based alloy, is formed.

The underlayer is typically sputtered to a thickness of between about 200–3,000 Å. The thickness of the sub-layer is controlled by the speed of substrate movement into and through the first sputtering chamber, and by the rate of sputtering in the chamber.

After formation of the underlayer, the substrate is moved downstream on the pallet into another sputtering chamber, where the magnetic layer is sputtered onto the underlayer. One exemplary cobalt-based alloy includes between 70–88% cobalt, 10–28% nickel, and 2–10% chromium, and more preferably, 74–78% cobalt, 15–25% nickel, and 5–10% chromium. Another exemplary cobalt-based alloy for forming the magnetic film includes 1–10% tantalum, 10–16% chromium, and 60–85% cobalt.

The magnetic thin film is sputtered onto the underlayer under known conditions to a final thickness of between about 100–800 Å.

In an alternative embodiment, the magnetic thin-film layer is composed of sublayers to form a bi-layer or a multi-layer structure. By way of example, a first magnetic layer is deposited to a thickness of between about 50–400 Å. A chromium-based isolation layer is deposited over the first magnetic layer, to a thickness of between 2–50 Å. A second magnetic layer is sputtered over the isolation layer, to a desired thickness, typically between 50–400 Å.

After formation of the magnetic thin-film layer, the substrate is carried on the pallet toward a sputtering station at which an overcoat of carbon, silicon oxide, silicon nitride or the like, is applied according to known sputtering methods.

After formation of the overcoat, the disc is coated with the lubricant composition of the present invention by any of several conventional methods. In one approach, the lubricant composition may be applied conventionally by spray buff using a tape roll or endless belt tape device designed to burnish and lubricate a finished disc surface.

In a second approach, the lubricant layer is applied by the spin coating technique, wherein lubricant is applied at or near the center of the disc and is then spread to the outer edge of the disc by centrifugal force due to the spinning of the disc.

In a third, preferred approach, the lubricant composition is applied using a dipping method. In one type of dipping method, called the "pull-up" or "lift-out" method, a disc is submerged in a dilute solution of lubricant and then gradually lifted out of the solution at a selected rate such that the lubricant is evenly coated onto the disc surface. In a second type of dipping method, called the "gravity draining" method, the disc is dipped with a vertical orientation into a dilute solution of lubricant or lubricant mixture for a selected time, and the solution is allowed to drain from the dipping tank at a controlled rate until the level of solution is no longer touching the disc. Evaporation of solvent from the disc surface produces a layer of lubricant on the disc. The thickness of the layer will depend on the initial concentration of lubricant in the lubricant solution, the time of exposure of the disc to the solution, the draining rate (or lifting rate, if a lift-out technique is used), and the solubility of the lubricant(s) in the solvent.

For deposition onto the disc surface, the perfluoropolyether and polyphenoxytriphosphazene compounds are dissolved in a suitable solvent in which both compounds are soluble, typically at concentrations of between about 0.001% and 1% (v/v relative to the solvent) such that the total concentration of the compounds is not greater than about 1%, more typically between about 0.002% and about 0.2%.

Where the compounds are present together in the same solvent, the solvent is one in which the lubricants are both readily soluble at their selected concentrations, or can be made soluble by inclusion of a co-solvent included to solubilize the less soluble lubricant.

Generally, the polyphenoxytriphosphazene compounds are soluble in both hydrocarbon solvents and certain perfluorinated solvents, whereas the perfluoropolyether compounds used in the invention show better solubility in perfluorinated solvents. Exemplary solvents in which the perfluoropolyether oils are soluble include CFC-113 ($CClF_2$–$CCl_2F$), "VERTREL XF" ($CF_3CHFCHFCF_2CF_3$) and "VERTREL 245 ($C_6F_{12}$)" (DuPont, Wilmington, Del.), and perfluorocarbons such as perfluorohexane, the latter which is sold by 3M under the tradename "PF-5060". Solvents in which the polyphenoxytriphosphazene compounds include n-hexane, CFC-113, the "VERTREL" solvents, and to a lesser extent, PF-5060 (in which the phosphazenes may be less soluble). Preferably, the solvent used is "PF-5060" or "VERTREL XF", with PF-5060 being preferred for low proportions of the phosphazene compound (i.e., for phosphazene:perfluoropolyether ratios between about 1:100 and 5:95). A mixture of solvents may also be used.

The dipping method for lubricant deposition may be carried out using a standard lubing device such as are commercially available from San Jose Technology Company (San Jose, Calif.). An unlubricated magnetic disc prepared as above is loaded in the lubing device, which is programmed to dip the disc for a selected time in lubricant solution. After being dipped in the solution, the disc is allowed to dry for a time sufficient for most or all of the solvent to evaporate. Usually, a few minutes or less is adequate. To accelerate the removal of solvent, reduced pressure or the passage of an inert gas over the disc surface (e.g., nitrogen) may be employed.

It will thus be appreciated that the thickness of the lubricant layer formed by the dipping method can be reduced by using a more dilute lubricant solution, by shortening the duration of exposure of the disc to the lubricant solution, or by using a solvent in which the lubricant(s) are more readily soluble. Similar principles will apply for if a spin-coat or spray-buff method application is used.

In the case of the dipping method, multiple layers of lubricant can be added by successive dipping and drying steps. Preferably, the surface is kiss-buffed between dipping steps by standard methods to remove surface imperfections from the disc surface. Typically, two dipping steps separated by a kiss-buff step are adequate.

In an alternative embodiment, the polyphenoxytriphosphazene and perfluoropolyether compounds are applied separately in alternating layers by the same general methods described as above. For example, a lubricant layer containing only a perfluoropolyether oil is applied by dipping, to produce a first layer of about 10 to 30 Å. The disc is then kiss-buffed, resulting in the loss of no more than a few Å of the lubricant layer. The disc is then dipped in a solution containing a polyphenoxy-cyclotriphosphazene compound alone or mixed with a perfluoropolyether oil, to produce a second sublayer on top of the first.

The thickness of each added sublayer of lubricant is between about 10 Å and about 30 Å, and typically between about 15 Å and 25 Å. The final thickness of the lubricating layer is typically between about 17 and about 35 Å, as measured by Fourier transform infrared (FTIR) spectroscopy (Nicolet, Fremont, Calif.). More generally, the final thickness of the lubricant layer is preferably selected to be near or equal to the roughness of the surface on which the lubricant layer is deposited. If the lubricant layer is too thin, relative to the roughness, the likelihood of wear-tracks forming in the surface will be increased. Conversely, a lubricant layer that is too thick will be accompanied by increased head/disc friction.

The present invention also contemplates the use of more than one polyphenoxycyclotriphosphazene compound and/ or more than one perfluoropolyether oil in the lubricant layer that is formed on the disc. However, one each of the polyphenoxycyclotriphosphazene compound and perfluoropolyether oil compound should suffice to obtain the benefits of the invention.

IV. Properties of the Lubricating Layer

As noted above, the present invention is based on the applicants' discovery that lubricant layers comprising a polyphenoxycyclotriphosphazene compound and perfluoropolyether oil provide unexpectedly improved lubricating properties (i.e., reduced friction between the read/write head and the disc surface) relative to those obtained using either polyphenoxycyclotriphosphazenes or perfluoropolyethers alone. While lower static and dynamic friction is observed for the lubricant combinations of the present invention at ambient temperature and humidity, the advantages over cyclophosphazene compounds or polyether compounds alone is especially pronounced under conditions of elevated temperature and humidity ("hot/wet" conditions of 30° C. and 80% humidity), or elevated temperature and reduced humidity ("hot/dry" conditions of 55° C. and 10% humidity).

Studies conducted in support of the invention have shown that although lubricant layers comprising a cyclophosphazene or perfluoropolyether alone are adequate under ambient conditions (stiction value less than 2, and often less than 1), such lubricant layers are significantly more susceptible to the formation of wear marks and crashing of the head onto the disc under hot/wet or hot/dry conditions. In contrast, the lubricant combinations of the present invention provide excellent frictional properties under both hot/wet and hot/dry conditions, with consistently low stiction values obtained (generally less than 1) even after 20,000 contact start/stop cycles.

Surprisingly, these improved frictional properties can be obtained even with relatively low proportions of cyclophosphazene compound relative to the perfluoropolyether oil. Specifically, significantly better frictional properties can be obtained, relative to the use of perfluoropolyether alone, with cyclophosphazene:perfluoropolyether ratios as low as 1:100 to 2.5:97.5. Cyclophosphazene ratios of less than 1:100 (i.e., less than 1% (v/v) cyclophosphazene relative to perfluoropolyether) are generally found inadequate to provide a significant improvement over use of polyether alone.

The improved frictional properties provided by the present invention significantly expand the environmental conditions under which magnetic disc media may be used. Prior to the present invention, conditions for reliable, satisfactory performance of magnetic discs have been limited to ambient temperature and humidity. With the increased level of both private and business travel, the need for lap-top computers that are resilient to elevated temperature conditions has increased. Previously, air-conditioning has usually been essential for obtaining acceptable disc durability. These limitations are now significantly reduced by the present invention.

Additional studies in support of the invention have shown the following additional advantages:

1. For standard magnetic discs rotating at 1 rpm, a significant reduction in outer diameter frictional force (between the head and disc) is generally observed.

2. The lubricant layers of the invention show lube migration rates (away from the axis of rotation) which are the same or slower than the migration observed for lubricant layers comprising cyclophosphazene or perfluoropolyether alone. For example, migration rates may be measured by determining the change in radial distribution of C-F groups as a function of time by FTIR (by monitoring the absorbance intensity at $\lambda \sim 1200$ cm$^{-1}$) at a spin rate of 10,000 rpm. The results show that the uniformity of the lubricant layer of the invention across the disc surface is at least as good as that observed using either cyclophosphazene or perfluoropolyether alone.

3. The improved frictional properties provided by the invention are obtained with variety of read/write heads from different manufacturers, e.g., conventional 2- and 3-rail heads, including TPC, NPAB, and Tripad slider heads which may be carbon-coated or non-carbon-coated.

Figure 6:
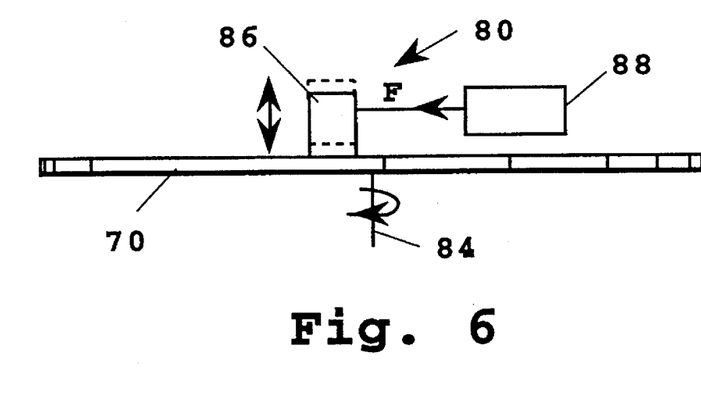
FIG. 6 shows an apparatus for measuring the frictional properties of the outer layer of a magnetic disc.

As noted above, two useful measures of the lubricating properties of a surface lubricant are the static coefficient of friction (stiction value) and the dynamic coefficient of friction, each of which can be measured by standard methods. FIG. 6 shows a schematic view of a device 80 used in measuring coefficients of friction on a disc surface, such as of disc 70. One suitable device of this type is a "Dysan" tester for measuring friction coefficients.

Briefly, the device includes a motor-driven rotor, indicated at 84, for rotating the disc at low speed. A standard 6.5 gram composite read/write head 86 in the device is mounted for movement between positions of contact (solid lines) and non-contact (dotted lines) with the disc. This head, in turn, is coupled to a force transducer 88 which measures the force (in the direction of disc movement) applied to the head during rotation of the disc. The force measurement is used to determine the static or dynamic coefficient of friction.

Dynamic friction coefficients are typically measured using a standard drag test in which the drag produced by contact between the head and disc is determined at a constant spin rate, e.g., 1 rpm. Static coefficients (stiction) are typically measured using a standard contact start-stop (CSS) test in which the peak level of friction is measured as the disc starts rotating from zero to a selected revolution rate (e.g., to 5000 rpm). After peak friction has been measured, the disc is brought to rest, and the start-stop process is repeated for a selected number of start-stop cycles.

Example 1 describes a comparative study with a lubricant formed with a commercial perfluoropolyether compound, Z-25, alone or as a mixture with the polyphenoxytriphosphazene compound, X-1p (FIG. 5, Dow Chemical Corp.). In preparing solution (ii), the X-1p compound was first dissolved in a small amount of CFC-113 e.g., in the proportion 2 mL X-1p to about 10 mL CFC-113, and this stock solution was then added to a fully diluted solution of Z-25 in PF-5060 (typically in 10 gallons of PF-5060).

The discs were coated with either lubricant solution using the dipping method. After a kiss-buffing step, each disc was again loaded in the lubing device and dipped in the same lubricant solution as before, and then allowed to air-dry for 30 minutes.

To measure stiction, the discs were subjected to up to 20,000 stop/start cycles, during the course of which the stiction value was recorded. These measurements were conducted under ambient conditions (22° C. and about 45% humidity), hot and wet conditions (30° C. and 80% humidity), and hot and dry conditions (50° C. and 10% humidity).

As can be seen from Table 1 in Example 1, the perfluoropolyether (Z-25) lubricant alone under ambient conditions exhibited stiction values in the range of 0.5 to 1.0. These values are comparable to the range of 0.5 to 1.2 reported for an outer surface layer containing only phosphazene X-1p (Dow Chemical Corp.). However, under ambient conditions, the Z-25/X-1p mixture provided significantly better lubricating properties than Z-25 or X-1p alone, exhibiting a dynamic friction coefficient in the range of about 0.3 to about 0.6.

With continued reference to Table 1, the perfluoropolyether lubricant alone showed substantially worse frictional properties under hot/wet conditions, with a friction coefficient of between 2 and 3 observed within the first few thousand stop/start cycles. The performance of the perfluoropolyether compound under hot/dry conditions was also poor, and wear marks formed in the disc surface.

In contrast, the perfluoropolyether/triphosphazene mixture showed excellent frictional properties under both hot/wet and hot/dry conditions, with frictional coefficients of between 0.3 and 0.7 for hot/wet conditions, and between 0.25 and 0.41 for the hot/dry conditions, even after 20,000 start/stop cycles. Furthermore, no wear marks were evident in any of the discs tested.

Examples 2 through 5 describe results obtained with further lubricant layers which were prepared in accordance with the invention. The Examples are intended to illustrate but not limit the scope of the invention.

EXAMPLE 1

Magnetic discs (3.5 inch diameter) having a chromium magnetic layer and a sputtered carbon overcoat were prepared by methods described above and then coated with lubricant as follows.

Two lubricant solutions were tested. The first solution (solution A) consisted of PF-5060 (perfluorohexane; 3M Company, St. Paul, Minn.) containing 0.1% (v/v) Z-25 perfluoropolyether (Ausimont). The second solution (solution B) consisted of PF-5060 containing 0.1% (v/v) Z-25 and 0.05% (v/v) of X-1p cyclotriphosphazene (FIG. 5, Dow Chemical Corp.). In preparing solution B, the X-1p compound was first dissolved in a small amount of CFC-113 (2 mL X-1p to about 10 mL CFC-113), and this solution was then added to a fully diluted solution of Z-25 in PF-5060 (10 gallons total volume).

The lubing device was a gravity flow luber, Model 7G1130/7G-195 from San Jose Technology Company (San Jose, Calif.). Each disc was dipped in one of the above lubricant solutions with a drain rate of 2 mm/second and then allowed to air-dry for 30 minutes. The disc was then kiss-buffed using a buffing device from Exclusive Design company (San Mateo, Calif.), Model No. 800 HDF-C, equipped with 0.3 μm particle size abrasive tape, No. 51190469 supplied by 3M Corp. (Minneapolis, Minn.). Buffing was conducted for 8 seconds using a tape pressure of 1 lb, a tape speed of 0.025 inches per second, and disc speed of 100 rpm.

After the kiss-buffing step was complete, each disc was again loaded in the lubing device and dipped in the same lubricant solution as before, and then allowed to air-dry for 30 minutes.

To measure stiction, the discs were subjected to up to 20,000 contact stop/start (CSS) cycles, over the course of which the stiction value was recorded by standard methods. These measurements were conducted under ambient conditions (22° C. and about 45% humidity), under hot/wet conditions (30° C., 80% humidity), and under hot/dry conditions (50° C., 10% humidity). The results are shown in Table 1.

TABLE 1

| | Stiction Values | |
| --- | --- | --- |
| Environment | Z-25 | Z-25/X-1p |
| Ambient | 0.5–1.0 | 0.3–0.6 |
| Hot/Wet | 2.0–3.0 | 0.3–0.7 |
| Hot/Dry | 1.0–2.0 | 0.25–0.41 |

EXAMPLE 2

Two lubricant solutions were prepared consisting of (a) PF-5060 containing 0.1% (v/v) "Z-DOL 2000", and (b) PF-5060 containing 0.097% (v/v) "Z-DOL 2000" perfluoropolyether and 0.003% (v/v) X-1p cyclophosphazene. Four discs were coated using solution (a), and three discs were coated using solution (b), using the dipping/buffing sequence from Example 1. The thickness of the resultant lubricant layer was about 29 Å. The discs were then subjected to iterative start/stop cycles under hot/wet conditions as in Example 1.

The results were as follows. For discs coated using solution (a), stiction values rose to an unacceptable level (greater than 2.0) within the first 2000 to 4000 cycles, and in one case, the disc head crashed after about 2000 cycles. However, for the three discs coated with the "Z-DOL"/X-1p mixture from solution (b), the average stiction value in each case remained steady over 15,000 continuous start/stop cycles. The observed average coefficients after 15,000 cycles were 0.44, 0.62, and 0.41, respectively. In addition, when four additional discs prepared with solution (b) were tested under ambient conditions, the observed average stiction values after 15,000 cycles were 0.50, 0.49, 0.53, and 0.25, respectively.

EXAMPLE 3

Three lubricant-coated discs were prepared as in Example 1 using a lubricant solution consisting of "VERTREL XF" (DuPont, Wilmington, Del.) containing Fomblin AM3001 perfluoropolyether (0.094%, v/v) and X-1p cyclophosphazene (0.006%, v/v). The thickness of the resultant lubricant layer was 17 Å. The discs were then subjected to contact start/stop testing under hot/wet conditions (30° C. 80% humidity) The observed average stiction values for the three discs were 0.32, 0.31, and 0.39 after about 4000 cycles, and 0.76, 0.85, and 0.46, respectively, after 25,000 cycles.

EXAMPLE 4

Three lubricant-coated discs were prepared as in Example 1 using a lubricant solution consisting of "VERTREL XF" containing Fomblin AM3001 perfluoropolyether (0.088%, v/v) and X-1p cyclophosphazene (0.012%, v/v). The discs were then subjected to contact start/stop testing under hot/dry (55° C., 10% humidity) conditions as above. The observed average stiction values for the three discs after about 8000 cycles were 0.27, 0.57, and 0.37, respectively. For two additional discs prepared by the same methods, stiction values of 0.20 and 0.52 were obtained after 25,000 cycles.

EXAMPLE 5

Eighteen lubricant-coated discs were prepared as in Example 1 using a lubricant solution consisting of PF-5060 containing Z-25 perfluoropolyether (0.097%, v/v) and X-1p cyclophosphazene (0.003%, v/v). The discs were then subjected to contact start/stop testing for 20,000 cycles under ambient (6 discs), hot/wet (8 discs), and hot/dry conditions (4 discs) as above.

The results were as follows. For the discs tested under ambient conditions, the measured stiction values were 0.59, 0.67, 0.61, 0.70, 0.94, and 0.43, respectively. For the discs tested under hot/wet conditions, the measured stiction values were 0.93, 0.55, 0.93, 0.94, 0.87, 0.85, 0.93, and 0.64. For the discs tested under hot/dry conditions, the measured stiction values were 0.33, 0.33, 0.79, and 1.51.

Although the invention has been described with respect to particular embodiments, it will be apparent to those skilled in the art that various changes and modifications can be made without departing from the invention.

It is claimed:

1. A thin-film magnetic recording disc for use with a read/write head in a disc drive, comprising a substrate, a magnetic recording film formed on the substrate, a protective overcoat formed on the recording film, and an outer lubricant layer comprising a hexaphenoxycyclotriphosphazene lubricant and a perfluoropolyether oil, wherein each phenoxy group in the lubricant, taken separately, is substituted with one or more short chain substituents selected from the group consisting of F, CF$_3$, OCF$_3$, CF$_2$CF$_3$, CH$_2$CF$_3$, OCF$_2$CF$_3$, and OCH$_2$CF$_3$,
and wherein said hexaphenoxycyclotriphosphazene lubricant and perfluoropolyether oil are present in relative proportions effective to provide a significant reduction in frictional drag relative to the reduction in drag provided by the hexaphenoxycyclotriphosphazene lubricant or perfluoropolyether oil alone.

2. The disc of claim 1, wherein the hexaphenoxycyclotriphosphazene lubricant and perfluoropolyether oil are present in a volume-to-volume ratio (lubricant:oil) of between 1:100 and 5:1.

3. The disc of claim 2, wherein the hexaphenoxycyclotriphosphazene lubricant and perfluoropolyether oil are present in a volume-to-volume ratio (lubricant:oil) from 1:100 to 1:1.

4. The disc of claim 1, wherein the hexaphenoxycyclotriphosphazene lubricant and perfluoropolyether oil are present in a volume-to-volume ratio (lubricant:oil) from 1:5 to 5:1.

5. The disc of claim 1, wherein at least one phenoxy group in said hexaphenoxycyclotriphosphazene lubricant contains a short chain substituent selected from the group consisting of F, and OCF$_3$.

6. The disc of claim 5, wherein said short chain substituent is selected from the group consisting of F, and CF$_3$.

7. The disc of claim 1, wherein the hexaphenoxycyclotriphosphazene lubricant and perfluoropolyether oil are present in separate sublayers which together form the outer lubricant layer.

8. The disc of claim 1, wherein the hexaphenoxycyclotriphosphazene lubricant and perfluoropolyether oil are present as a mixture in the lubricant layer.

9. The disc of claim 1, wherein the protective overcoat is a sputtered carbon overcoat.

* * * * *